United States Patent
Inoue et al.

(10) Patent No.: US 11,292,860 B2
(45) Date of Patent: *Apr. 5, 2022

(54) ETHYLENE-VINYL ALCOHOL COPOLYMER PELLETS, RESIN COMPOSITION, AND MULTILAYER STRUCTURE

(71) Applicant: MITSUBISHI CHEMICAL CORPORATION, Tokyo (JP)

(72) Inventors: Kota Inoue, Osaka (JP); Honoka Hashimoto, Osaka (JP); Nobuaki Sato, Osaka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/434,554

(22) Filed: Jun. 7, 2019

(65) Prior Publication Data

US 2019/0300632 A1 Oct. 3, 2019

Related U.S. Application Data

(63) Continuation of application No. PCT/JP2017/042812, filed on Nov. 29, 2017.

(30) Foreign Application Priority Data

Dec. 20, 2016 (JP) .............................. JP2016-246508
Mar. 10, 2017 (JP) .............................. JP2017-045642

(51) Int. Cl.
| | |
|---|---|
| *C08F 210/02* | (2006.01) |
| *C08F 216/06* | (2006.01) |
| *C08F 8/16* | (2006.01) |
| *C08J 3/12* | (2006.01) |
| *C08L 29/04* | (2006.01) |
| *B32B 27/28* | (2006.01) |

(52) U.S. Cl.
CPC ............ *C08F 216/06* (2013.01); *B32B 27/28* (2013.01); *C08F 8/16* (2013.01); *C08F 210/02* (2013.01); *C08J 3/12* (2013.01); *C08L 29/04* (2013.01); *C08F 2500/24* (2013.01)

(58) Field of Classification Search
CPC .. C08F 8/48; C08F 8/16; C08F 210/02; C08F 216/06
See application file for complete search history.

(56) References Cited

U.S. PATENT DOCUMENTS

| 6,552,123 B1 | 4/2003 | Katayama et al. |
| 6,576,704 B2 | 6/2003 | Nagao et al. |
| 9,951,199 B2 | 4/2018 | Nonaka et al. |
| 2003/0060550 A1 | 3/2003 | Inomata et al. |
| 2007/0106031 A1 | 5/2007 | Uchiumi et al. |
| 2013/0040087 A1 | 2/2013 | Kazeto et al. |
| 2013/0225756 A1 | 8/2013 | Igarashi et al. |
| 2014/0213701 A1 | 7/2014 | Nonaka et al. |
| 2015/0140247 A1* | 5/2015 | Shibutani ................ B32B 27/08 428/36.91 |
| 2017/0198066 A1 | 7/2017 | Matsui |
| 2018/0194876 A1 | 7/2018 | Yoshida et al. |
| 2019/0100610 A1 | 4/2019 | Sato |

FOREIGN PATENT DOCUMENTS

| CN | 1259594 A | 7/2000 |
| CN | 128798 A | 4/2001 |
| CN | 102906186 A | 1/2013 |
| CN | 103282424 | 9/2013 |
| CN | 103635526 | 3/2014 |
| EP | 3395841 A1 | 10/2018 |
| JP | 2000309607 A | * 11/2000 |
| JP | 2001-163 921 | 6/2001 |
| JP | 2002-80606 | 3/2002 |
| TW | 2005-00203 | 1/2005 |
| TW | 201307399 | 1/2013 |
| TW | 201609390 | 3/2016 |
| WO | 2004/092234 | 10/2004 |
| WO | 2013/005807 | 1/2013 |
| WO | 2017/110752 A1 | 6/2017 |
| WO | 2017/047559 A1 | 8/2018 |

OTHER PUBLICATIONS

English translation of International Preliminary Report on Patentability (IPRP) in relation to International patent application No. PCT/JP2017/042812 dated Jul. 4, 2019.
International Search Report issued in International Patent Application No. PCT/JP2017/042812, dated Mar. 6, 2018.
Supplemental European Search Report issued in EP Patent Application No. 17883327.3 dated Nov. 18, 2019.
Singaporean Office Action issued in SG Patent Application No. 11201905211Q. dated Aug. 3, 2020.
Office Action issued in Chinese Patent Application No. 201780075203.9, dated May 6, 2021, English translation.
Office Action issued in Singapore Patent Application No. 11201905211Q, dated Jun. 18, 2021.
Search Report attached to Notice of Allowance issued in TW Patent Application No. 106141504, dated Apr. 9, 2021, English translation.

* cited by examiner

*Primary Examiner* — Irina S Zemel
*Assistant Examiner* — Jeffrey S Lenihan
(74) *Attorney, Agent, or Firm* — Greenblum & Bernstein, P.L.C.

(57) ABSTRACT

Ethylene-vinyl alcohol copolymer pellets comprise an ethylene-vinyl alcohol copolymer and water, and have a water content of not higher than 0.5 wt. %, wherein the ratio (Y/Z) of a lactone ring content (Y) to the sum (Z) of a carboxylic acid content (X) and the lactone ring content (Y) in terminal structures of the ethylene-vinyl alcohol copolymer is not less than 60 mol %. The pellets are excellent in high-temperature thermal decomposition-suppressing effect and thermal stability, and are free from odor emanation and coloration even if being processed at a higher temperature.

6 Claims, 2 Drawing Sheets ized as "EVOH"), particularly, saponified ethylene-vinyl acetate copolymers, are excellent in gas barrier property, mechanical strength, and other properties and, therefore, are widely used for films, sheets, containers, fibers, and other various applications.

ETHYLENE-VINYL ALCOHOL COPOLYMER PELLETS, RESIN COMPOSITION, AND MULTILAYER STRUCTURE

RELATED APPLICATION

This application is a continuation of International Application No. PCT/JP2017/042812, filed on Nov. 29, 2017, which claims priority to Japanese Patent Application No. 2016-246508 filed on Dec. 20, 2016, and 2017-045642 filed on Mar. 10, 2017, the entire contents of each of which being hereby incorporated by reference.

TECHNICAL FIELD

The present disclosure relates to ethylene-vinyl alcohol copolymer pellets, more specifically, ethylene-vinyl alcohol copolymer pellets excellent in heat stability at a higher temperature as well as gas barrier property, and to a resin composition and a multilayer structure produced by using the pellets.

BACKGROUND ART

Ethylene-vinyl alcohol copolymers (hereinafter sometimes abbreviated as "EVOH"), particularly, saponified ethylene-vinyl acetate copolymers, are excellent in gas barrier property, mechanical strength, and other properties and, therefore, are widely used for films, sheets, containers, fibers, and other various applications.

The saponified ethylene-vinyl acetate copolymers are produced by copolymerizing ethylene and vinyl acetate, removing unreacted vinyl acetate, and saponifying the resulting ethylene-vinyl acetate copolymer.

A variety of products are formed from such an EVOH by melt-forming processes such as extrusion and injection molding. In the melt forming of the EVOH, the melt forming temperature is high, typically 200° C. or higher. Therefore, the EVOH is susceptible to thermal degradation, so that the resulting formed product is liable to have a poorer quality with fisheyes and gel-like objects (spots).

An exemplary method for suppressing the thermal degradation of the EVOH at a higher temperature is proposed, in which the total content of a carboxylic acid unit and a lactone ring unit at polymer terminals of the EVOH is controlled to not higher than 0.12 mol % based on the total content of an ethylene unit, a vinyl alcohol unit, and a vinyl ester unit of the EVOH (see, for example, PTL 1).

RELATED ART DOCUMENT

Patent Document

PTL 1: WO2004/092234

SUMMARY

The art disclosed in PTL 1 provides a certain thermal degradation-suppressing effect, but the effect is not satisfactorily proved because films sampled after a lapse of 50 hours were evaluated for occurrence of gel-like objects therein by visual inspection. With recent technological advancement, the EVOH requires further improvement. For example, there is a demand for an EVOH that is excellent in thermal decomposition-suppressing effect even at a higher temperature and is free from odor emanation and coloration even if being processed at higher temperature.

In order to meet the demand, the present disclosure provides EVOH pellets that are excellent in thermal stability and thermal decomposition-suppressing effect even at a higher temperature and are free from odor emanation and coloration even if being processed at higher temperature, and provides a resin composition and a multilayer structure produced by using the EVOH pellets.

In view of the foregoing, the inventors conducted intensive studies and, as a result, found that EVOH pellets that have a lactone ring content greater than a carboxylic acid content in its terminal structures and have a very low water content can serve as an ingredient that is excellent in thermal stability and free from odor emanation and coloration even if being processed at a higher temperature.

According to a first aspect of the present disclosure, EVOH pellets are provided, which comprise an EVOH and water; wherein the EVOH comprises monomer units including at least an ethylene unit and a vinyl alcohol unit, and a carboxylic acid group and a lactone ring present in terminal structures of the EVOH, wherein the ratio (Y/Z) of a lactone ring content (Y) to the sum (Z) of a carboxylic acid content (X) and the lactone ring content (Y) is not less than 60 mol %; and wherein the EVOH pellets have a water content of not higher than 0.5 wt. %.

According to a second aspect of the present disclosure, there is provided a resin composition that contains a resin component of the EVOH pellets. According to a third aspect of the present disclosure, there is provided a multilayer structure that includes at least one layer containing a resin component of the EVOH pellets or the resin composition.

In the EVOH pellets of the present disclosure, the EVOH has a lactone ring content ratio (Y/Z) of not less than 60 mol % with respect to the sum (Z) of the carboxylic acid content (X) and the lactone ring content (Y) in the EVOH terminal structures. In addition, the EVOH pellets have a water content of not higher than 0.5 wt. %. With this arrangement, the EVOH is excellent in high-temperature thermal stability, so that the EVOH pellets are free from odor emanation and coloration even if being processed at a higher temperature.

Where the sum (Z) of the carboxylic acid content (X) and the lactone ring content (Y) is 0.01 to 0.3 mol % based on the total amount of the monomer units of the EVOH, the EVOH pellets are better in thermal stability.

Where the lactone ring content (Y) is 0.01 to 0.3 mol % based on the total amount of the monomer units of the EVOH, the EVOH pellets are still more excellent in thermal stability.

Where the carboxylic acid content (X) is 0.01 to 0.3 mol % based on the total amount of the monomer units of the EVOH, the EVOH pellets are further excellent in thermal stability.

Since the resin composition of the present disclosure contains the resin component of the EVOH pellets of the present disclosure excellent in thermal stability, the resin composition is excellent in thermal stability, and can be formed into a high-quality product free from odor emanation and coloration even if being processed at a higher temperature.

Since the multilayer structure of the present disclosure has at least one layer containing the resin component of the EVOH pellets of the present disclosure or the resin composition of the present disclosure excellent in thermal stability, the multilayer structure is excellent in thermal stability, and is advantageous in that its quality is less liable to be thermally influenced.

DESCRIPTION OF EMBODIMENTS

Figure 1:
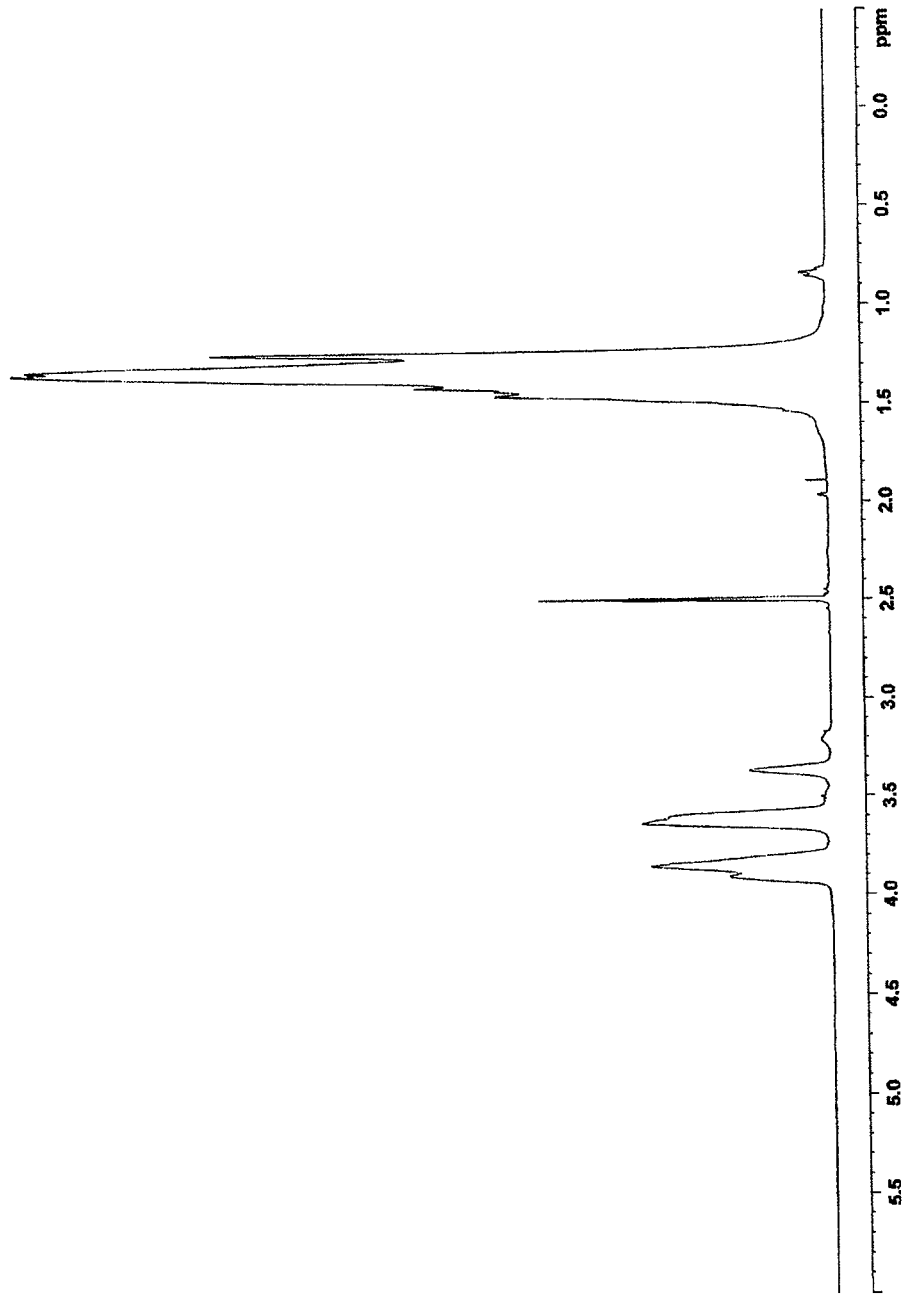
FIG. 1 is a typical $^1$H-NMR chart of an EVOH in a DMSO-D6 solvent.

Embodiments of the present disclosure will hereinafter be described in detail. It should be understood that the present disclosure be not limited to the following embodiments.

According to a first feature, the EVOH pellets of the present disclosure contain the EVOH that has a lactone ring content ratio (Y/Z) of not less than 60 mol % with respect to the sum (Z) of the carboxylic acid content (X) and the lactone ring content (Y) in the EVOH terminal structures. According to a second feature, the EVOH pellets contain water, and have a water content of not higher than 0.5 wt. % based on the weight of the pellets.

That is, the lactone ring is chemically more stable than the carboxylic acid group. Therefore, the EVOH pellets having a higher terminal lactone ring content are supposedly less susceptible to a decomposition reaction during heating, and excellent in high-temperature thermal stability. On the other hand, water molecules serve to promote the hydrolysis of lactone rings. In addition, the water molecules per se function as a heat conductor. It was found that, with a higher water content, the EVOH pellets are poorer in high-temperature thermal stability than expected, even if the lactone ring content is higher than the carboxylic acid content. Therefore, the water content of the EVOH pellets of the present disclosure is limited to the very low level. This makes it possible to sufficiently ensure the high-temperature thermal-stabilization effect of the lactone rings while suppressing the decomposition reaction of the lactone rings.

The EVOH to be used for the EVOH pellets of the present disclosure is typically a resin prepared by copolymerizing ethylene and a vinyl ester monomer, and then saponifying the resulting copolymer, or a water-insoluble thermoplastic resin generally referred to as an ethylene-vinyl alcohol copolymer or a saponified ethylene-vinyl ester copolymer. A known polymerization method such as solution polymerization method, suspension polymerization method or emulsion polymerization method may be utilized for polymerization {for the preparation of the EVOH}. In general, a solution polymerization method using a lower alcohol such as methanol or ethanol as a solvent, particularly preferably using methanol as a solvent, is utilized. The saponification of the resulting ethylene-vinyl ester copolymer may be achieved by a known method.

In general, the EVOH mainly contains an ethylene structural unit and a vinyl alcohol structural unit, and further contains a small amount of a vinyl ester structural unit left unsaponified as required.

Vinyl acetate is typically used as the vinyl ester monomer, because it is easily commercially available and ensures a higher impurity treatment efficiency in the preparation. Other examples of the vinyl ester monomer include aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate, and aromatic vinyl esters such as vinyl benzoate. The aliphatic vinyl esters typically have a carbon number of 3 to 20, preferably 4 to 10, particularly preferably 4 to 7. These vinyl esters may be typically each used alone or, as required, a plurality of vinyl esters may be selected from these vinyl esters to be used in combination.

The EVOH typically has an ethylene structural unit content of 20 to 60 mol %, preferably 25 to 50 mol %, particularly preferably 25 to 35 mol %, as measured in conformity with ISO14663. If the ethylene structural unit content is excessively low, the EVOH tends to be poorer in high-humidity gas barrier property and melt formability for gas barrier applications. If the ethylene structural unit content is excessively high, on the other hand, the EVOH tends to be poorer in gas barrier property.

The saponification degree of the vinyl ester component in the EVOH is typically 90 to 100 mol %, preferably 95 to 100 mol %, particularly preferably 99 to 100 mol %, as measured in conformity with JIS K6726 (with the use of a solution obtained by homogenously dissolving the EVOH in a water/methanol solvent). If the saponification degree is excessively low, the EVOH tends to be poorer in gas barrier property, thermal stability, humidity resistance, and the like.

Further, the EVOH typically has a melt flow rate (MFR) of 0.5 to 100 g/10 minutes, preferably 1 to 50 g/10 minutes, particularly preferably 2 to 35 g/10 minutes, as measured at 210° C. with a load of 2160 g. If the MFR is excessively high, the EVOH tends to have unstable film formability. If the MFR is excessively low, the EVOH tends to have an excessively high viscosity, making the melt extrusion difficult.

The EVOH may further contain a structural unit derived from any of the following comonomers in an amount (e.g., not greater than 10 mol %) that does not impair the effects of the present disclosure.

The comonomers include: olefins such as propylene, 1-butene, and isobutene; hydroxyl-containing α-olefins such as 2-propen-1-ol, 3-buten-1-ol, 4-penten-1-ol, 5-hexen-1-ol, 3,4-dihydroxy-1-butene, and 5-hexene-1,2-diol, and derivatives including esterification products of these hydroxyl-containing α-olefins such as 3,4-diacyloxy-1-butene (particularly, 3,4-diacetoxy-1-butene, and the like), and acylation products of these hydroxyl-containing α-olefins such as 2,3-diacetoxy-1-allyloxypropane, 2-acetoxy-1-allyloxy-3-hydroxypropane, 3-acetoxy-1-allyloxy-2-hydroxypropane, glycerin monovinyl ether, and glycerin monoisopropenyl ether; hydroxyalkyl vinylidenes such as 2-methylenepropane-1,3-diol and 3-methylenepentane-1,5-diol; vinylidene diacetates such as 1,3-diacetoxy-2-methylenepropane, 1,3-dipropionyloxy-2-methylenepropane, and 1,3-dibutyronyloxy-2-methylenepropane; unsaturated acids such as acrylic acid, methacrylic acid, crotonic acid, phthalic acid (anhydride), maleic acid (anhydride), and itaconic acid (anhydride), salts of these unsaturated acids, and monoalkyl and dialkyl esters of these unsaturated acids having a carbon number of 1 to 18; acrylamide compounds such as acrylamide, N-alkyl acrylamides having a carbon number of 1 to 18, N,N-dimethyl acrylamide, 2-acrylamidopropane sulfonic acid and its salts, and acrylamidopropyldimethylamine and its acid salts and quaternary salts; methacrylamide compounds such as methacrylamide, N-alkyl methacrylamides having a carbon number of 1 to 18, N,N-dimethyl methacrylamide, 2-methacrylamidopropane sulfonic acid and its salts, and methacrylamidopropyldimethylamine and its acid salts and quaternary salts; N-vinylamides such as N-vinylpyrrolidone, N-vinylformamide, and N-vinylacetamide; vinyl cyanates such as acrylonitrile and methacrylonitrile; vinyl ethers such as alkyl vinyl ethers, hydroxyalkyl vinyl ethers, and alkoxyalkyl vinyl ethers having a carbon number of 1 to 18; halogenated vinyl compounds such as vinyl chloride, vinylidene chloride, vinyl fluoride, vinylidene fluoride, and vinyl bromide; vinylsilanes such as trimethoxyvinylsilane; allyl acetate, halogenated allyl compounds such as allyl chloride, and allyl alcohol compounds such as allyl alcohol and dimethoxyallyl alcohol; and trimethyl(3-acrylamido-3-dimethylpropyl)ammonium chloride and acrylamido-2-methylpropane sulfonic acid. These may be used alone or in combination.

A post-modified EVOH such as an urethanized, acetalized, cyanoethylated or oxyalkylenated EVOH may be used as the EVOH of the present disclosure.

Particularly, an EVOH prepared by copolymerization with a hydroxyl-containing α-olefin is preferred because of its excellent secondary formability, and an EVOH containing a primary hydroxyl group in its side chain is preferred. Particularly, an EVOH having a 1,2-diol structure in its side chain is preferred.

The EVOH having the 1,2-diol structure in its side chain contains a 1,2-diol structural unit in its side chain. An EVOH containing a structural unit represented by the following structural formula (1) is most preferred.

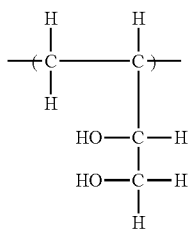

(1)

Particularly, where the EVOH contains the 1,2-diol structural unit, the content of the 1,2-diol structural unit is typically 0.1 to 20 mol %, preferably 0.5 to 15 mol %, particularly preferably 1 to 10 mol %.

In general, the EVOH contains the lactone ring or the carboxylic acid group present in its terminal structures. According to the first feature, as previously described, the EVOH to be used for the EVOH pellets of the present disclosure has a lactone ring content ratio (Y/Z) of not less than 60 mol % with respect to the sum (Z) of the carboxylic acid content (X) and the lactone ring content (Y) in the EVOH terminal structures.

In the present disclosure, the lactone ring is present in a greater amount than the carboxylic acid group in the EVOH terminal structures. Thus, the EVOH is excellent in high-temperature thermal stability, and is free from odor emanation and coloration even if being processed at higher temperature.

In the present disclosure, the lactone ring content ratio (Y/Z) is preferably not less than 60 mol %, more preferably 60 to 90 mol %, particularly preferably 62 to 80 mol %, especially preferably 63 to 70 mol %, for the high-temperature thermal stability. If the content ratio (Y/Z) is excessively low, the EVOH tends to be poorer in thermal stability. If the content ratio is excessively high, the EVOH tends to be poorer in adhesion to an adhesive resin layer when being used for a multilayer structure.

In the present disclosure, the sum (Z) of the carboxylic acid content (X) and the lactone ring content (Y) in the EVOH terminal structures is preferably 0.01 to 0.3 mol %, particularly preferably 0.03 to 0.28 mol %, more preferably 0.05 to 0.25 mol %, especially preferably 0.1 to 0.24 mol %, particularly preferably 0.17 to 0.23 mol %, based on the total amount of the monomer units of the EVOH for thermal stability. If the sum (Z) is excessively small, the EVOH tends to be poorer in adhesion to the adhesive resin layer when being used for the multilayer structure. If the sum (Z) is excessively great, the EVOH tends to be poorer in thermal stability.

The monomer units herein include an ethylene unit represented by the following structural formula (2), a vinyl alcohol unit represented by the following structural formula (3), a vinyl acetate unit represented by the following structural formula (4), and other copolymerized monomer units, and the total amount of the monomer units means the total molar amount of these monomer units.

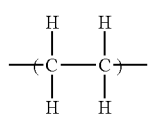

(2)

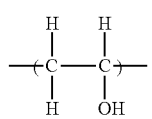

(3)

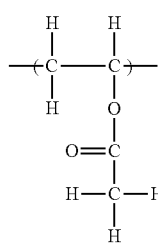

(4)

The carboxylic acid content (X) is preferably 0.01 to 0.3 mol % for thermal stability, particularly preferably 0.02 to 0.25 mol %, more preferably 0.03 to 0.2 mol %, especially preferably 0.05 to 0.1 mol %, more preferably 0.05 to 0.08 mol %, based on the total amount of the monomer units of the EVOH. If the carboxylic acid content (X) is excessively low, the EVOH tends to be poorer in adhesion to the adhesive resin layer when being used for the multilayer structure. If the carboxylic acid content (X) is excessively high, the EVOH tends to be poorer in thermal stability.

The lactone ring content (Y) is preferably 0.01 to 0.3 mol % for thermal stability, particularly preferably 0.02 to 0.25 mol %, more preferably 0.03 to 0.2 mol %, especially preferably 0.05 to 0.15 mol %, based on the total amount of the monomer units of the EVOH. If the lactone ring content (Y) is excessively low, the EVOH tends to be poorer in adhesion to the adhesive resin layer when being used for the multilayer structure. If the lactone ring content (Y) is excessively high, the EVOH tends to be poorer in thermal stability.

The carboxylic acid content (X), the lactone ring content (Y), and the lactone ring content ratio (Y/Z) are determined by NMR measurement. The carboxylic acid group herein includes carboxylic acid groups and carboxylic acid salt groups, and the carboxylic acid content (X) means the total content of the carboxylic acid groups and the carboxylic acid salt groups.

The NMR measurement is performed, for example, in the following manner. In the present disclosure, "ppm" is based on weight.

<Measurement Conditions>
Apparatus: Bruker's AVANCE III
Measurement frequency: 400 MHz
Solvent: Heavy water/ethanol-D6 (having a heavy water/ethanol-D6 weight ratio of 35/65), and DMSO (dimethyl sulfoxide)-D6
Polymer concentration: 5 wt. %

Measurement temperatures: 70° C. for heavy water/ethanol-D6, and 50° C. for DMSO-D6
Integration number: 16
Pulse recurrence time: 4 seconds
Sample rotation speed: 20 Hz
Additive: Trifluoroacetic acid <Analysis Method>

(1-1) Measurement of Terminal Methyl Amount

The terminal methyl amount is calculated based on $^1$H-NMR measurement (measurement with DMSO-D6 at 50° C.). More specifically, the terminal methyl amount is calculated from the following expression (Ex. 1) by using an integration value ($I_{Me-1}$) of a peak appearing between 0.7 and 0.95 ppm for terminal methyl, an integration value ($I_{CH2}$) of peaks appearing between 0.95 and 1.85 ppm for non-terminal methylene (a total integration value of peaks for methylene in the ethylene unit, the vinyl alcohol unit, and the vinyl acetate unit), an integration value ($I_{OAc}$) of a peak appearing between 1.9 and 2 ppm for terminal methyl in the vinyl acetate unit, and an integration value ($I_{CH}$) of peaks appearing between 3.1 and 4.3 ppm for methine in the vinyl alcohol unit as shown as FIG. 1.

Terminal methyl amount (mol %)=$(I_{Me-1}/3)/[(I_{Me-1}/3)+(I_{OAc}/3)+I_{CH}+\{I_{CH2}-2\times I_{CH}-2\times (I_{OAc}/3)-2\times (I_{Me-1}/3)\}/4]$ (Ex. 1)

(1-2) Measurement of Carboxylic Acid Content (X) and Lactone Ring Content (Y)

Figure 2:
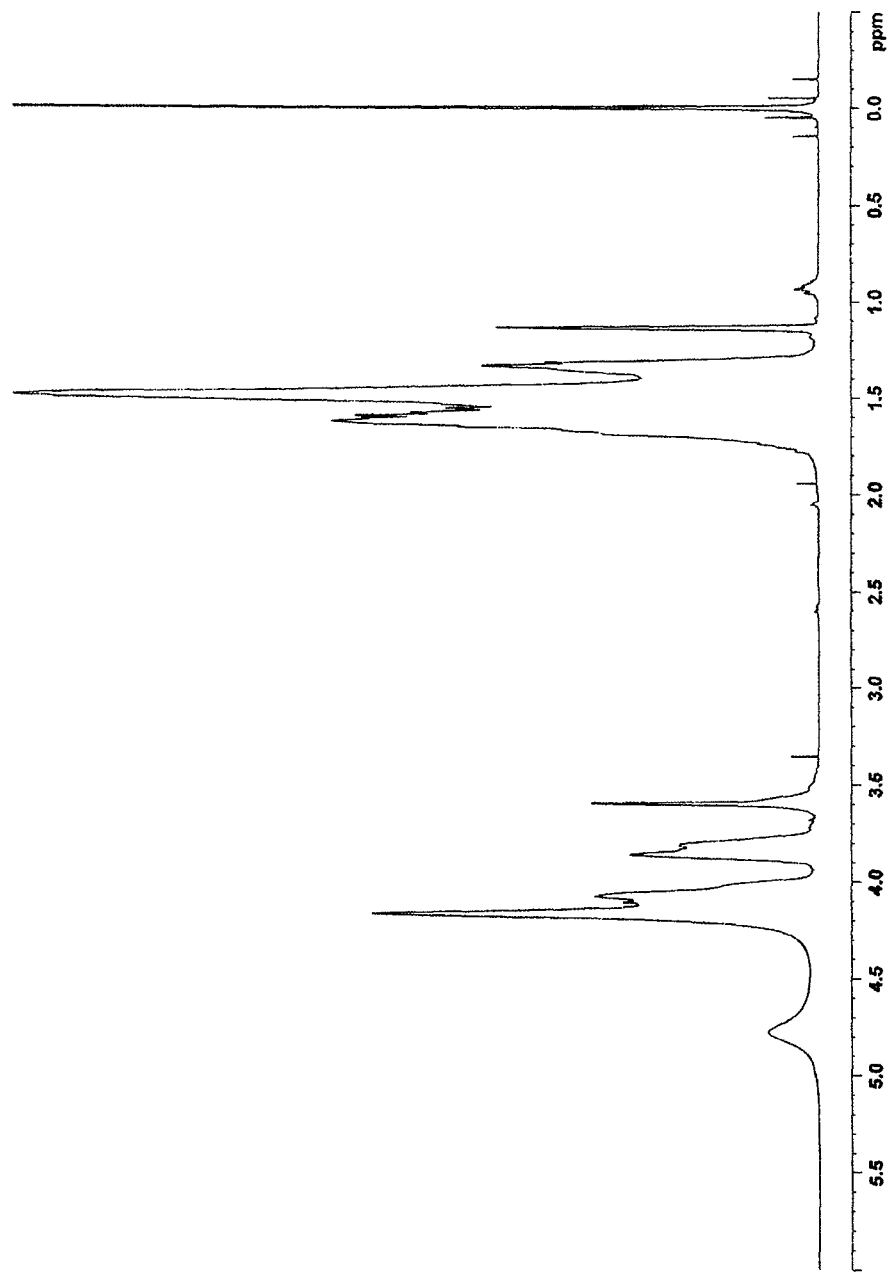
FIG. 2 is a typical $^1$H-NMR chart of the EVOH in a heavy water/ethanol-D6 solvent.

The contents of the carboxylic acid group and the lactone ring present at polymer terminals are calculated based on the terminal methyl amount (mol %) obtained in the item (1-1) and $^1$H-NMR measurement (measurement with a heavy water/ethanol-D6 solvent at 70° C.). More specifically, the carboxylic acid content (X) (mol %) and the lactone ring content (Y) (mol %) are calculated from the following expressions (Ex. 2) and (Ex. 3), respectively, by using an integration value ($I_{Me-2}$) of a peak appearing between 0.7 and 1 ppm for terminal methyl, an integration value ($I_x$) of a peak appearing between 2.15 and 2.32 ppm, and an integration value ($I_y$) of a peak appearing between 2.5 and 2.7 ppm as shown in FIG. 2.

Carboxylic acid content (X) (mol %)=Terminal methyl amount (mol %)$\times (I_x/2)/(I_{Me-2}/3)$ (Ex. 2)

Lactone ring content (Y) (mol %)=Terminal methyl amount (mol %)$\times (I_y/2)/(I_{Me-2}/3)$ (Ex. 3)

(1-3) Calculation of Lactone Ring Content Ratio (Y/Z) with Respect to Sum (Z) of Carboxylic Acid Content (X) and Lactone Ring Content (Y) in Terminal Structures The lactone ring content ratio (Y/Z) is calculated from the following expression (Ex. 4) based on the carboxylic acid content (X) and the lactone ring content (Y) calculated above.

Lactone ring content ratio (Y/Z) (mol %) with respect to sum (Z) of carboxylic acid content (X) and lactone ring content (Y) (mol %)=$\{Y/(X+Y)\}\times 100$ (Ex. 4)

In an EVOH production process including a saponifying step [I] of saponifying the ethylene-vinyl ester copolymer to provide an EVOH intermediate product, a chemical treatment step [II] of chemically treating the EVOH intermediate product with a chemical treatment liquid, and a drying step [III] of drying the chemically treated EVOH intermediate product, exemplary methods for controlling the lactone ring content ratio (Y/Z) to not less than 60 mol % with respect to the sum (Z) of the carboxylic acid content (X) and the lactone ring content (Y) in the EVOH terminal structures in the present disclosure include: (1) a method in which a higher drying temperature is employed in the drying step [III]; (2) a method in which a longer drying period is employed in the drying step [III]; and (3) a method in which a chemical treatment liquid having a higher carboxylic acid concentration is used in the chemical treatment step [II]. These methods (1) to (3) may be used alone or in combination.

Particularly, in the production process including the saponifying step [I] of saponifying the ethylene-vinyl ester copolymer to provide the EVOH intermediate product, the chemical treatment step [II] of chemically treating the EVOH intermediate product with the chemical treatment liquid, and the drying step [III] of drying the chemically treated EVOH intermediate product, the carboxylic acid concentration of the chemical treatment liquid is preferably controlled at a higher level in the following manner in the chemical treatment step [II] in the method (3). More specifically, it is preferred, for the high-temperature thermal stability, that a carboxylic acid and a carboxylic acid metal salt are used in combination as chemical treatment agents for the chemical treatment liquid, that the carboxylic acid concentration of the chemical treatment liquid is controlled at a higher level, and that the weight-based concentration ratio between the carboxylic acid concentration and the metal ion concentration of the carboxylic acid metal salt (carboxylic acid concentration/metal ion concentration) is controlled to not less than 3.7.

The EVOH production process to be employed in the present disclosure will hereinafter be described in detail.

In the saponifying step [I], the ethylene-vinyl ester copolymer prepared by the copolymerization of ethylene and the vinyl ester monomer is saponified by a generally known method.

At this stage, the saponified ethylene-vinyl ester copolymer (EVOH intermediate product) may be pelletized, and the resulting pellets may be subjected to the chemical treatment step [II] and the drying step [III] to be described below.

A conventionally known method may be used for the pelletization of the EVOH intermediate product. Exemplary methods for the pelletization include: a hot cutting method including the steps of extruding the EVOH intermediate product in a melted state from an extrusion head, cutting the extruded EVOH intermediate product in a melted state, and cooling and solidifying the resulting pieces of the extruded EVOH intermediate product into pellets; and a strand cutting method including the steps of extruding a resin solution or slurry of the EVOH intermediate product (EVOH hydrous composition) into a solidification bath, cooling and solidifying the extruded EVOH intermediate product, and cutting the resulting EVOH strands.

The shape of the pellets generally depends upon the pellet production method, and may be any of various shapes including cylindrical shape, spherical shape, rugby ball-like shape, cubic shape, square prism shape, irregular shape, and the like. The size of the pellets may be properly controlled by the diameter of the nozzle of the extruder to be used, the number of cutter blades, the rotation speed of the cutter blades, and the like.

In the chemical treatment step [II], the EVOH intermediate product is chemically treated with the chemical treatment liquid containing the chemical treatment agents. This step is performed to impart the EVOH with thermal stability and adhesiveness. Various compounds are usable as the chemical treatment agents, and examples of the compounds include carboxylic acids and inorganic acids such as boric acid and phosphoric acid, and esters and metal salts of the carboxylic acids and the inorganic acids. These compounds are generally soluble in water. The chemical treatment liquid is an aqueous solution containing any of these compounds.

Specific examples of the carboxylic acids to be used as the chemical treatment agents include acetic acid, propionic acid, butyric acid, and stearic acid. For thermal stability, C1 to C4 aliphatic carboxylic acids are preferred, and C1 to C4 aliphatic monovalent carboxylic acids are more particularly preferred. Particularly, acetic acid is preferred. Examples of the inorganic acids include carbonic acid and sulfuric acid in addition to boric acid and phosphoric acid.

Examples of the metal salts of the carboxylic acids and the inorganic acids include salts of alkali metals, salts of alkali earth metals, and salts of d-block metals of the fourth period of the Periodic Table. Examples of the alkali metals include sodium and potassium. Examples of the alkali earth metals include calcium and magnesium. Examples of the d-block metals of the fourth period of the Periodic Table include titanium, manganese, copper, cobalt, and zinc. The alkali metal salts are preferred, and the sodium salts and the potassium salts are particularly preferred.

Examples of the carboxylic acid metal salts include: alkali metal salts of the carboxylic acids including alkali metal acetates such as sodium acetate and potassium acetate, alkali metal propionates such as sodium propionate and potassium propionate, and alkali metal stearates such as sodium stearate and potassium stearate; and alkali earth metal salts of the carboxylic acids including alkali earth metal acetates such as magnesium acetate and calcium acetate, alkali earth metal propionates such as magnesium propionate and calcium propionate, and alkali earth metal stearates such as magnesium stearate and calcium stearate. These may be used alone or in combination.

Examples of the inorganic acid metal salts include: alkali metal salts of the inorganic acids including alkali metal borates such as sodium borate and potassium borate, and alkali metal phosphates such as sodium phosphate and potassium phosphate; and alkali earth metal salts of the inorganic acids including alkali earth metal borates such as magnesium borate and calcium borate, and alkali earth metal phosphates such as magnesium phosphate and calcium phosphate. The phosphates herein include hydrogen phosphates. These metal salts may be used alone or in combination.

For the thermal stability, the carboxylic acids and the metal salts of the carboxylic acids are preferred as the chemical treatment agents. Further, the carboxylic acids, the metal salts of the carboxylic acids, the inorganic acids, and the metal salts of the inorganic acids are preferred. More specifically, acetic acid, the metal acetates, boric acid, and the phosphates are preferred. These may be used alone or in combination.

In order to uniformly and speedily incorporate any of the aforementioned compounds as the chemical treatment agents to the EVOH intermediate product, the EVOH intermediate product preferably has a water content of 20 to 80 wt. %. When the EVOH intermediate product is treated in contact with the chemical treatment liquid, the content of the compound may be adjusted by controlling the concentration of, the compound in the aqueous solution, the period of the contact treatment, the temperature for the contact treatment, the stirring speed in the contact treatment, and the water content of the EVOH intermediate product to be treated.

In the chemical treatment step [II], the weight-based concentration ratio of the carboxylic acid concentration to the metal ion concentration of the carboxylic acid metal salt in the chemical treatment liquid (carboxylic acid concentration/metal ion concentration) is preferably not less than 3.7, particularly preferably not less than 13, more preferably not less than 22, further preferably not less than 25, especially preferably not less than 30, for the high-temperature thermal stability. If the ratio is excessively low, the EVOH tends to be poorer in thermal stability. The upper limit of the ratio is typically 100, preferably 50.

The chemical treatment step [II] of chemically treating the EVOH intermediate product with the chemical treatment liquid may be a single-stage chemical treatment step in which a chemical treatment liquid containing the carboxylic acid in a higher concentration is used, or may be a multi-stage chemical treatment step in which a plurality of chemical treatment liquids containing the carboxylic acid in different concentrations are used. The expression "the weight-based concentration ratio of the carboxylic acid concentration to the metal ion concentration of the carboxylic acid metal salt in the chemical treatment liquid (carboxylic acid concentration/metal ion concentration) is not less than 3.7" in the chemical treatment step [II] means that the weight-based concentration ratio of the carboxylic acid concentration to the metal ion concentration of the carboxylic acid metal salt (carboxylic acid concentration/metal ion concentration) is not less than 3.7 in the chemical treatment liquid containing the carboxylic acid in the higher concentration for use in the single-stage chemical treatment step. The above expression also means that the weight-based concentration ratio of the carboxylic acid concentration to the metal ion concentration of the carboxylic acid metal salt (carboxylic acid concentration/metal ion concentration) is not less than 3.7 in a chemical treatment liquid containing the carboxylic acid in the highest concentration among the plurality of chemical treatment liquids for use in the multi-stage chemical treatment step as will be described later.

For efficient production of the EVOH excellent in thermal stability, the multi-stage chemical treatment step is preferred in which the plural chemical treatment liquids having different carboxylic acid concentrations are used for the respective chemical treatments. The multi-stage chemical treatment step for the chemical treatment step [II] of chemically treating the EVOH intermediate product with the chemical treatment liquid is performed in the following manner. First, the plural chemical treatment liquids having different carboxylic acid concentrations are prepared. Then, the EVOH intermediate product is chemically treated on multiple stages by using the plural chemical treatment liquids for the respective chemical treatments in the multi-stage chemical treatment step. In this case, the weight-based concentration ratio of the carboxylic acid concentration to the metal ion concentration of the carboxylic acid metal salt (carboxylic acid concentration/metal ion concentration) is preferably not less than 3.7 in the chemical treatment liquid having the highest carboxylic acid concentration among the plurality of chemical treatment liquids.

In the present disclosure, the carboxylic acid concentration of the chemical treatment liquid is preferably 1 to 50,000 ppm, particularly preferably 10 to 10,000 ppm, especially preferably 400 to 5,000 ppm. The metal ion concentration of the carboxylic acid metal salt is preferably 1 to 50,000 ppm, particularly preferably 10 to 10,000 ppm, for treatment efficiency and costs.

In the present disclosure, the term "carboxylic acid concentration" means the concentration of the carboxylic acid contained as the chemical treatment agent in the chemical treatment liquid. Where acetic acid is contained as the carboxylic acid, for example, the carboxylic acid concentration means the concentration of acetic acid in the chemical treatment liquid. Further, the term "the metal ion concentration of the carboxylic acid metal salt" means the concentration of metal ions of the carboxylic acid metal salt contained as the chemical treatment agent in the chemical treatment liquid. Where sodium acetate is contained in the chemical treatment liquid, for example, the metal ion concentration of the carboxylic acid metal salt means the concentration of sodium ions. Where a carboxylic acid and a carboxylic acid metal salt are used in combination as the chemical treatment agents, carboxyl ions contained in the carboxylic acid metal salt are not counted in the carboxylic acid concentration. Where acetic acid and sodium acetate are used in combination as the chemical treatment agents, acetate ions contained in sodium acetate are not counted in the carboxylic acid concentration.

In the chemical treatment step [II], the treatment temperature is typically 10° C. to 100° C., preferably 15° C. to 80° C., more preferably 20° C. to 60° C. If the treatment temperature is excessively low, it will be difficult to incorporate a predetermined amount of an acid or an acid salt into the EVOH intermediate product. If the treatment temperature is excessively high, it will be difficult to handle the solution, resulting in disadvantageous production.

In the chemical treatment step [II], the treatment period is typically not shorter than 1 hour, preferably 1.5 to 48 hours, more preferably 2 to 24 hours. If the treatment period is excessively short, the EVOH intermediate product tends to suffer from uneven color and/or poorer thermal stability. If the treatment period is excessively long, the EVOH intermediate product tends to be colored.

In the drying step [III], the chemically treated EVOH intermediate product is dried. For the drying conditions, the drying temperature is preferably 80° C. to 150° C., more preferably 90° C. to 140° C., particularly preferably 100° C. to 130° C. If the drying temperature is excessively low, the drying period tends to be prolonged. If the drying temperature is excessively high, the EVOH intermediate product tends to be colored. The drying period is preferably not shorter than 3 hours, more preferably not shorter than 5 hours, particularly preferably not shorter than 8 hours. If the drying period is excessively short, the EVOH intermediate product tends to be insufficiently dried. The upper limit of the drying period is typically 1,000 hours.

Various drying processes are usable for the drying. Exemplary drying processes include a fluidized drying process in which the chemically-treated substantially-pelletized EVOH intermediate product is dried while being agitated and spread mechanically or by hot air, and a stationary drying process in which the chemically-treated substantially-pelletized EVOH intermediate product is dried without dynamic motions such as the agitation and the spreading. Exemplary dryers for the fluidized drying process include drum/groove type agitation dryer, round pipe dryer, rotary dryer, fluid bed dryer, vibrating fluid bed dryer, and conical rotor type dryer. Exemplary dryers for the stationary drying process include non-material-moving type dryers such as batch box type dryer, and material-moving type dryers such as band dryer, tunnel dryer, and vertical dryer. The fluidized drying process and the stationary drying process may be used in combination for the drying. In the present disclosure, it is preferred to perform the fluidized drying process and then the stationary drying process for suppression of fusion sticking of the chemically treated EVOH intermediate product.

The drying process will be described in greater detail.

In the fluidized drying process, air or an inert gas (e.g., nitrogen gas, helium gas, argon gas or the like) is used as a heating gas. The temperature of the heating gas is properly selected from a range of 40° C. to 150° C. according to the volatile content of the chemically treated EVOH intermediate product. In consideration of the fact that the chemically treated EVOH intermediate product is liable to suffer from the fusion sticking at a higher temperature, the temperature of the heating gas is preferably 40° C. to 100° C., more preferably 40° C. to 90° C. Further, the flow speed of the heating gas in the dryer is preferably 0.7 to 10 m/second, more preferably 0.7 to 5 m/second, particularly preferably 1 to 3 m/second. If the flow speed is excessively low, the chemically treated EVOH intermediate product is liable to suffer from the fusion sticking. If the flow speed is excessively high, on the other hand, the chemically treated EVOH intermediate product is liable to be chipped or broken into particles. The period for the fluidized drying process depends upon the amount of the chemically treated EVOH intermediate product to be dried, but is typically 5 minutes to 36 hours, preferably 10 minutes to 24 hours. After the chemically treated EVOH intermediate product is subjected to the fluidized drying process under the aforementioned conditions, the EVOH preferably has a volatile content of 5 to 60 wt. %, more preferably 10 to 55 wt. %. If the volatile content is excessively high, the chemically treated EVOH intermediate product is liable to suffer from the fusion sticking in the subsequent stationary drying process. An excessively low volatile content is not industrially preferred because of a greater energy loss. In the fluidized drying process, the volatile content is preferably reduced by not less than 5 wt. %, more preferably 10 to 45 wt. %, as compared with the volatile content before the process. If the reduction in volatile content is excessively small, minute fisheyes are liable to occur in a product melt-formed from the EVOH intermediate product.

The EVOH pellets of the present disclosure are produced by drying the chemically treated EVOH intermediate product in the aforementioned manner. As described above, the EVOH pellets thus produced by the drying should have a water content of not higher than 0.5 wt. %. If the water content is excessively high, as described above, the EVOH pellets are liable to be poorer in high-temperature thermal stability due to the promotion of the hydrolysis reaction of the lactone rings and the heat conductivity of water molecules themselves. If the EVOH pellets contain no water or have an excessively low water content, however, the EVOH pellets tend to be poorer in long-run formability. Therefore, the water content of the EVOH pellets is preferably 0.05 to 0.5 wt. %, more preferably 0.1 to 0.48 wt. %, particularly preferably 0.15 to 0.45 wt. %.

The water content is based on the weight of the EVOH pellets that are EVOH pellets as a final product containing not only water but also optional additives.

Exemplary methods for controlling the water content of the EVOH pellets to not higher than 0.5 wt. % include: (1) a method employing a higher drying temperature; (2) a method employing a longer drying period; and (3) a method in which the humidity of the drying gas is regulated at a lower level.

In the present disclosure, the water content of the EVOH pellets is measured by the following method.

<Measurement of Water Content>

The weight C1 of an aluminum cup is measured at a room temperature (25° C.), and 10 g of the EVOH pellets are put in the aluminum cup. Then, the weight (C1+P1) of the aluminum cup containing the EVOH pellets (having a weight P1) is measured. The aluminum cup containing the EVOH pellets is heat-treated at 150° C. for 5 hours in a dryer (SAFETY OVEN SPH-100 commercially available from ESPEC Corporation) without replacement with nitrogen and vacuum drawing. After the heat treatment, the aluminum cup containing the EVOH pellets is taken out of the dryer and placed still in a desiccator containing a desiccant for 30 minutes, whereby the temperature of the EVOH pellets is returned to a room temperature (25° C.). Then, the weight (C1+P2) of the aluminum cup containing the heat-treated EVOH pellets (having a weight P2) is measured, and the water content (wt. %) is calculated from the following expression (5):

$$\text{Water content (wt. \%)} = \{[(C1+P1)-(C1+P2)]/[(C1+P1)-C1]\} \times 100 = [(P1-P2)/P1] \times 100 \quad (5)$$

In the present disclosure, a significant heat stability-improving effect is advantageously provided by controlling the water content at a lower level, particularly, where the lactone ring content ratio (Y/Z) with respect to the sum (Z) of the carboxylic acid content (X) and the lactone ring content (Y) in the EVOH terminal structures is not less than 60 mol %. This is supposedly because, with a higher lactone ring content ratio, the percentage of lactone rings not influenced by the hydrolysis-promoting effect of water is increased.

The EVOH pellets of the present disclosure thus produced typically have a melt flow rate (MFR) of 0.1 to 100 g/10 minutes, particularly preferably 0.5 to 50 g/10 minutes, more preferably 1 to 30 g/10 minutes (as measured at 210° C. with a load of 2160 g). If the melt flow rate is excessively low, it will be difficult to extrude the EVOH due to a higher torque in an extruder during the extrusion. If the melt flow rate is excessively high, a product formed from the EVOH pellets through a heat-stretching process tends to be poorer in appearance and gas barrier property.

The MFR of the EVOH pellets may be controlled by controlling the polymerization degree of the EVOH intermediate product or by adding a crosslinking agent or a plasticizer to the EVOH intermediate product.

As long as the object of the present disclosure is not impaired, the EVOH pellets of the present disclosure may contain: lubricant such as saturated fatty acid amide (e.g., stearamide or the like), unsaturated fatty acid amide (e.g., oleamide or the like), bis-fatty acid amide (e.g., ethylene bis-stearamide or the like), fatty acid metal salt (e.g., calcium stearate, magnesium stearate or the like), or low-molecular-weight polyolefin (e.g., low-molecular-weight polyethylene or low-molecular-weight polypropylene having a molecular weight of about 500 to about 10,000, or the like); inorganic salt (e.g., hydrotalcites or the like); plasticizer (e.g., aliphatic polyhydric alcohol such as ethylene glycol, glycerin or hexanediol); oxygen absorber [e.g., inorganic oxygen absorber such as reduced iron powder, reduced iron powder containing a water-absorbing substance, an electrolyte or the like, aluminum powder, potassium sulfite or photo-catalytic titanium oxide; organic compound oxygen absorber such as polyvalent phenol compound (e.g., ascorbic acid, ascorbic acid ester or ascorbic acid metal salt, hydroquinone, gallic acid, hydroxyl-containing phenol aldehyde resin or the like), coordination compound obtained by coordination-bonding a nitrogen-containing compound and a transition metal (e.g., bis-salicylaldehyde-imine cobalt, tetraethylenepentamine cobalt, cobalt-Schiff base complex, porphyrins, macrocyclic polyamine complex, polyethyleneimine-cobalt complex or the like), terpene compound, reaction product obtained by reaction between an amino acid and a hydroxyl-containing reductive substance, or triphenylmethyl compound; or polymer oxygen absorber such as coordination compound obtained by coordination-bonding a nitrogen-containing resin and a transition metal (e.g., combination of MXD nylon and cobalt), blend of a tertiary hydrogen-containing resin and a transition metal (e.g., combination of polypropylene and cobalt), blend of an unsaturated carbon-carbon bond-containing resin and a transition metal (e.g., combination of polybutadiene and cobalt), photo-oxidation degradative resin (e.g., polyketone), anthraquinone polymer (e.g., polyvinylanthraquinone), or mixture containing any of these blends and a photo initiator (benzophenone or the like), peroxide scavenger (commercially available antioxidant or the like) or deodorant (active carbon or the like)]; thermal stabilizer; photo stabilizer; UV absorber; colorant; antistatic agent; surfactant; antibacterial agent; antiblocking agent; slipping agent; filler (e.g., inorganic filler or the like); and/or some other resin (e.g., polyolefin, polyamide or the like). These compounds may be used alone or in combination.

The EVOH pellets of the present disclosure thus produced may be used as they are in a pellet form, or may be used to prepare a resin composition in various forms, e.g., in a powdery form or in a liquid form, for use as a forming material for various products. The EVOH pellets of the present disclosure are preferably used as pellets for melt forming to more advantageously provide the effects of the present disclosure.

The resin composition of the present disclosure may be a resin composition prepared by mixing the EVOH pellets of the present disclosure with resin pellets other than the EVOH pellets. Exemplary products to be formed from the EVOH pellets of the present disclosure or the resin composition of the present disclosure for practical applications include a single-layer film formed by using the EVOH pellets of the present disclosure or the resin composition of the present disclosure, and a multilayer structure including at least one layer formed by using the EVOH pellets of the present disclosure or the resin composition of the present disclosure.

The multilayer structure will hereinafter be described.

For production of the multilayer structure of the present disclosure, a layer formed by using the EVOH pellets of the present disclosure or the resin composition of the present disclosure is laminated with some other base material (a thermoplastic resin or the like) on one or both sides thereof. Exemplary laminating methods include: a laminating method in which the other base material is melt-extruded onto a film or a sheet formed by using the EVOH pellets or the like of the present disclosure; a laminating method in which the EVOH pellets or the like of the present disclosure is melt-extruded onto the other base material; a method in which the EVOH pellets or the like of the present disclosure and the other base material are coextruded; and a method in which a film or a sheet (layer) formed by using the EVOH pellets or the like of the present disclosure and the other base material (layer) are dry-laminated together with the use of a known adhesive agent such as of organic titanium compound, isocyanate compound, polyester compound or polyurethane compound. The melt forming temperature for the melt extrusion is generally selected from a range of 150° C. to 300° C.

Specific examples of the other base material include: olefin homopolymers and copolymers including polyethylenes such as linear low-density polyethylenes, low-density polyethylenes, very-low-density polyethylenes, medium-density polyethylenes, and high-density polyethylenes, ethylene-vinyl acetate copolymers, ionomers, ethylene-propylene (block or random) copolymers, ethylene-acrylic acid copolymers, ethylene-acrylate copolymers, polypropylenes, propylene-α-olefin (C4 to C20 α-olefin) copolymers, polybutenes, and polypentenes, and polyolefin resins in a broader sense such as obtained by graft-modifying any of these olefin homopolymers and copolymers with an unsaturated carboxylic acid or an unsaturated carboxylic acid ester; and polyester resins, polyamide resins (including polyamide copolymers), polyvinyl chlorides, polyvinylidene chlorides, acryl resins, polystyrene resins, vinyl ester resins, polyester elastomers, polyurethane elastomers, chlorinated polyethylenes, chlorinated polypropylenes, aromatic and aliphatic polyketones, polyalcohols obtained by reduction of these polymers, and EVOHs other than the EVOH to be used in the present disclosure. From the viewpoint of the practicality and the physical properties (particularly, the strength) of the multilayer structure, the polyolefin resins, the polyamide resins, the polystyrene resins, and the polyester resins are preferred. Further, the polypropylenes, the ethylene-propylene (block or random) copolymers, the polyamide resins, the polyethylenes, the ethylene-vinyl acetate copolymers, the polystyrenes, polyethylene terephthalates (PET), and polyethylene naphthalates (PEN) are preferably used.

Where a product, such as a film or a sheet, formed by using the EVOH pellets or the like of the present disclosure is extrusion-coated with the other base material, or where the film or the sheet formed by using the EVOH pellets or the like of the present disclosure and a film, a sheet or the like of the other base material are laminated together with the use of the adhesive agent, usable examples of the base material other than the thermoplastic resins described above include paper, metal foil, uniaxially or biaxially stretched plastic film or sheet, film or sheet on which an inorganic compound is vapor-deposited, woven fabric, nonwoven fabric, metal fiber material and wood material.

Where layers a (a1, a2, . . . ) formed by using the EVOH pellets of the present disclosure or the resin composition of the present disclosure and layers b (b1, b2, . . . ) of the other base material (e.g., the thermoplastic resin) are laminated together to produce a multilayer structure having an innermost layer a, the layered configuration of the multilayer structure of the present disclosure is not limited to a double layer structure a/b (which means an inner layer/outer layer structure, and this definition also applies to the following description), but may be any combination of these layers, e.g., a/b/a, a1/a2/b, a/b1/b2, a1/b1/a2/b2, a1/b1/b2/a2/b2/b1, or the like. Where the multilayer structure further includes a regrind layer R formed of a mixture containing at least the EVOH of the EVOH pellets or the like of the present disclosure and the thermoplastic resin, the layered configuration of the multilayer structure may be, for example, a/R/b, a/R/a/b, a/b/R/a/R/b, a/b/a/R/a/b, a/b/R/a/R/a/R/b, or the like.

In the aforementioned layered configuration, as required, an adhesive resin layer may be provided between the layers. Various adhesive resins are usable as an adhesive resin for the adhesive resin layer. Examples of the adhesive resin for providing a highly stretchable multilayer structure include olefin polymers modified as containing a carboxyl group by chemically bonding an unsaturated carboxylic acid or its anhydride to the olefin polymers (the aforementioned polyolefin resins in a broader sense) by an addition reaction, a graft reaction or the like.

Specific preferred examples of the modified olefin polymers containing the hydroxyl group include polyethylenes graft-modified with maleic anhydride, polypropylenes graft-modified with maleic anhydride, ethylene-propylene (block or random) copolymers graft-modified with maleic anhydride, ethylene-ethyl acrylate copolymers graft-modified with maleic anhydride, and ethylene-vinyl acetate copolymers graft-modified with maleic anhydride, which may be used alone or in combination as a mixture. In this case, the proportion of the unsaturated carboxylic acid or its anhydride to be contained in such a modified olefin polymer is preferably 0.001 to 3 wt. %, more preferably 0.01 to 1 wt. %, particularly preferably 0.03 to 0.5 wt. %. If the modification degree of such a modification product is excessively low, the adhesiveness tends to be poorer. If the modification degree is excessively high, on the other hand, a cross linking reaction tends to occur, thereby reducing the formability.

Further, the adhesive resin may be blended with the EVOH of the EVOH pellets of the present disclosure, the other EVOH, a rubber/elastomer component such as polyisobutylene or ethylene-propylene rubber, or the resin for the layer b. Particularly, the adhesiveness can be advantageously improved by blending a polyolefin resin different from the base polyolefin resin for the adhesive resin.

The thicknesses of the respective layers of the multilayer structure cannot be unconditionally specified, but depend upon the layered configuration, the type of the layer b, the use purpose, the shape of the formed product, and the required physical properties. The thickness of the layer a is typically selected from a range of 5 to 500 µm, preferably 10 to 200 µm, and the thickness of the layer b is typically selected from a range of 10 to 5,000 µm, preferably 30 to 1,000 µm. The thickness of the adhesive resin layer is typically selected from a range of 5 to 400 µm, preferably about 10 to about 150 µm.

The multilayer structure may be used as it is in various forms. It is preferred to perform a heat stretching process on the multilayer structure for improvement of the physical properties of the multilayer structure. The term "heat stretching process" herein means a process in which a thermally uniformly heated laminate in the form of a film, a sheet or a parison is uniformly formed into a cup, a tray, a tube or a film with the use of a chuck, a plug, a vacuum force, a compressed air force, blowing means, or other forming means. The stretching process may be a uniaxial stretching process or a biaxial stretching process. The stretching ratio of the laminate is preferably as high as possible for physical properties. This makes it possible to produce stretched formed products excellent in gas barrier property without pinholes, cracking, uneven stretching, uneven thickness, delamination (interlayer separation), and the like, which may otherwise occur during the stretching.

Other exemplary methods for stretching the multilayer structure include roll stretching method, tenter stretching method, tubular stretching method, stretch-blowing method, and vacuum pressure forming method each having a higher stretching ratio. A simultaneous biaxial stretching method or a sequential biaxial stretching method may be employed for the biaxial stretching process. The stretching temperature is selected from a range of 60° C. to 170° C., preferably about 80° C. to about 160° C. It is also preferred to perform a heat-setting process after the completion of the stretching process. The heat-setting process may be performed by known means. The heat-setting may be achieved by heat-treating the stretched film at 80° C. to 170° C., preferably 100° C. to 160° C., for about 2 to about 600 seconds while keeping the stretched film in tension.

Where the multilayer structure is used for heat-shrink packaging applications for raw meat, processed meat, cheese or the like, the multilayer structure not subjected to the heat-setting process after the stretching is used as a product film, and the raw meat, the processed meat, the cheese or the like is wrapped with the film, which is in turn heat-treated at 50° C. to 130° C., preferably 70° C. to 120° C., for about 2 to about 300 seconds to be thereby heat-shrunk for tight packaging.

The multilayer structure thus produced may be used in any desired form. Exemplary forms include film, sheet, tape, and profile extrusion product. As required, the multilayer structure may be subjected to heat treatment, cooling process, rolling process, printing process, dry laminating process, solution or melt coating process, bag making process, deep drawing process, box making process, tube making process, splitting process, or the like.

Cups, trays, tubes, and other containers produced from the multilayer structure, and bags and caps produced from the stretched film formed from the multilayer structure are useful as packaging materials for packaging foods, beverages, pharmaceutical products, cosmetics, industrial chemicals, detergents, agricultural chemicals, fuels, and the like.

EXAMPLES

Embodiments of the present disclosure will hereinafter be described more specifically by way of examples thereof. However, it should be understood that the embodiments of the present disclosure be not limited to these examples within the scope of the present disclosure.

In the following description, "parts" "%" and "ppm" are based on weight, and "mol %" is based on mol.

Physical properties were determined in the following manner.

(1) Quantitative Analysis of EVOH Terminal Structures (NMR Method)
<Measurement Conditions>
Apparatus: Bruker's AVANCE III
Measurement frequency: 400 MHz
Solvent: Heavy water/ethanol-D6 (having a heavy water/ethanol-D6 weight ratio of 35/65), and DMSO-D6
Polymer concentration: 5%
Measurement temperatures: 70° C. for heavy water/ethanol-D6, and 50° C. for DMSO-D6
Integration number: 16
Pulse recurrence time: 4 seconds
Sample rotation speed: 20 Hz
Additive: Trifluoroacetic acid
<Analysis Method>
(1-1) Measurement of Terminal Methyl Amount The terminal methyl amount was calculated based on $^1$H-NMR measurement (measurement with DMSO-D6 at 50° C.) (with a chemical shift determined with respect to a peak appearing at 2.50 ppm for DMSO). The terminal methyl amount was calculated from the following expression (Ex. 1) by using an integration value ($I_{Me-1}$) for terminal methyl between 0.7 and 0.95 ppm, an integration value ($I_{CH2}$) for non-terminal methylene between 0.95 and 1.85 ppm (a total integration value for methylene in the ethylene unit, the vinyl alcohol unit, and the vinyl acetate unit), an integration value ($I_{OAc}$) for terminal methyl in the vinyl acetate unit between 1.9 and 2 ppm, and an integration value ($I_{CH}$) for methine in the vinyl alcohol unit between 3.1 and 4.3 ppm as shown in FIG. 1. Here, the integration values ($I_{Me-1}$), ($I_{CH2}$), ($I_{OAc}$), and ($I_{CH}$) were integration values of peaks attributable to the terminal methyl, the non-terminal methylene, the terminal methyl in the vinyl acetate unit, and the methine in the vinyl alcohol unit, respectively.

Terminal methyl amount (mol %)=$(I_{Me-1}/3)/[(I_{Me-1}/3)+(I_{OAc}/3)+I_{CH}+\{I_{CH2}-2\times I_{CH}-2\times(I_{OAc}/3)-2\times(I_{Me-1}/3)\}/4]$ (Ex. 1)

(1-2) Measurement of Carboxylic Acid Content (X) and Lactone Ring Content (Y)

The amounts of the carboxylic acid group and the lactone ring present in polymer terminals were calculated based on $^1$H-NMR measurement (measurement with a heavy water/ethanol-D6 solvent at 70° C.) (with a chemical shift determined with respect to a peak appearing at 0 ppm for TMS) by using the terminal methyl amount (mol %) obtained in the item (1-1). More specifically, the carboxylic acid content (X) (mol %) and the lactone ring content (Y) (mol %) were calculated from the following expressions (Ex. 2) and (Ex. 3), respectively, by using an integration value ($I_{Me-2}$) of a peak appearing between 0.7 and 1 ppm for terminal methyl, an integration value ($I_x$) of a peak appearing between 2.15 and 2.32 ppm and an integration value ($I_Y$) of a peak appearing between 2.5 and 2.7 ppm as shown in FIG. 2. Here, the integration values ($I_{Me-2}$), ($I_x$), and ($I_Y$) were integration values of peaks attributable to the terminal methyl, the carboxylic acid group, and the terminal lactone ring, respectively.

Carboxylic acid content (X) (mol %)=Terminal methyl amount (mol %)$\times(I_x/2)/(I_{Me-2}/3)$ (Ex. 2)

Lactone ring content (Y) (mol %)=Terminal methyl amount (mol %)$\times(I_Y/2)/(I_{Me-2}/3)$ (Ex. 3)

(1-3) Calculation of Lactone Ring Content Ratio (Y/Z) with Respect to Sum (Z) of Carboxylic Acid Content (X) and Lactone Ring Content (Y) in Terminal Structures The lactone ring content ratio (Y/Z) was calculated from the following expression (Ex. 4) based on the carboxylic acid content (X) and the lactone ring content (Y) calculated above.

If the calculations are impossible due to the presence of additives, impurities and the like other than the EVOH, a sample cleaning process or the like may be performed. The sample cleaning process is performed, for example, by the following method. More specifically, a sample is freeze-crushed, and the crushed sample is immersed in water to be ultrasonically cleaned. Then, the resulting sample is filtered, and the filtration residue is dried. The NMR measurement is performed on the dried filtration residue.

Lactone ring content ratio (Y/Z) (mol %) with respect to sum (Z) of carboxylic acid content (X) and lactone ring content (Y)=$\{Y/(X+Y)\}\times100$ (Ex. 4)

(2) Water Content (%)
<Measurement of Water Content>

The weight C1 of an aluminum cup was measured at a room temperature (25° C.), and 10 g of the EVOH pellets were put in the aluminum cup. Then, the weight (C1+P1) of the aluminum cup containing the EVOH pellets (having a weight P1) was measured. The aluminum cup containing the EVOH pellets was heat-treated at 150° C. for 5 hours in a dryer (SAFETY OVEN SPH-100 commercially available from ESPEC Corporation) without replacement with nitrogen and vacuum drawing. After the heat treatment, the aluminum cup containing the EVOH pellets was taken out of the dryer and placed still in a desiccator containing a desiccant for 30 minutes, whereby the temperature of the EVOH pellets was returned to a room temperature (25° C.). Then, the weight (C1+P2) of the aluminum cup containing the heat-treated EVOH pellets (having a weight P2) was measured, and the water content (%) was calculated from the following expression (5):

Water content (wt. %)=$\{[(C1+P1)-(C1+P2)]/[(C1+P1)-C1]\}\times100=[(P1-P2)/P1]\times100$ (5)

(3) Evaluation for Thermal Stability

The thermal stability was measured by using 5 mg of the EVOH pellets by means of a thermogravimetric analyzer (PYRIS 1 TGA available from Perkin Elmer Corporation). The EVOH pellets were evaluated for the thermal stability based on a temperature at which the weight of the EVOH pellets was reduced to 95% of the original weight. Further, the EVOH pellets were evaluated for the thermal stability based on a temperature at which the weight of the EVOH pellets was reduced from 95% of the original weight by the original water content of the EVOH pellets.

Here, the measurement was performed at a temperature elevation rate of 10° C./minute within a temperature range of 30° C. to 550° C. at a gas flow rate of 20 mL/minute in a nitrogen atmosphere by the TGA.

Reference Example 1

A water/methanol mixed solution (having a water/methanol weight ratio of 35/65 and an EVOH resin concentration of 40%) of an ethylene-vinyl alcohol copolymer intermediate product having an ethylene content of 32 mol %, a saponification degree of 99.5 mol %, and an MFR of 12 g/10 minutes (measured at 210° C. with a load of 2160 g) was prepared. Then, the solution of the EVOH intermediate product was extruded into a strand form in a water bath containing cold water. The resulting strands were solidified, and then cut by a cutter, whereby cylindrical pellets of the EVOH intermediate product (having a water content of 100 parts based on 100 parts of the EVOH intermediate product) were produced.

Subsequently, the EVOH intermediate product pellets were fed into an aqueous solution containing 350 ppm of acetic acid, 370 ppm of sodium acetate, 15 ppm of calcium dihydrogenphosphate, and 57 ppm of boric acid, and stirred at 30° C. to 35° C. for 1 hour. Then, this stirring process was performed five times by changing the aqueous solution (first-stage chemical treatment step). The weight-based concentration ratio of the carboxylic acid concentration to the metal ion concentration of the carboxylic acid metal salt in the aqueous solution used in the first-stage chemical treatment step (carboxylic acid concentration/metal ion concentration) was 3.0.

Then, the resulting EVOH intermediate product pellets were fed into an aqueous solution containing 700 ppm of acetic acid, 370 ppm of sodium acetate, 15 ppm of calcium dihydrogenphosphate, and 57 ppm of boric acid, and stirred at 30° C. to 35° C. for 4 hours, whereby the acetic acid content of the EVOH intermediate product pellets was adjusted (second-stage chemical treatment step). The weight-based concentration ratio of the carboxylic acid concentration to the metal ion concentration of the carboxylic acid metal salt in the aqueous solution used in the second-stage chemical treatment step (carboxylic acid concentration/metal ion concentration) was 6.7.

The resulting EVOH intermediate product pellets were dried to a water content of 20% in a fluid bed dryer of batch tower type by passing nitrogen gas at 75° C. through the fluid bed dryer for 3 hours. Then, the EVOH intermediate product pellets were further dried in a ventilation dryer of batch box type by passing nitrogen gas at 125° C. through the ventilation dryer for 18 hours. Thus, EVOH pellets (each having a diameter of 2.3 mm and a length of 2.4 mm) were produced. The measurement results for the EVOH pellets thus produced are shown below in Table 1.

Example 1

EVOH pellets were produced in substantially the same manner as in Reference Example 1, except that the amount of acetic acid contained in the aqueous solution used in the second-stage chemical treatment step was changed from 700 ppm to 1,400 ppm and the weight-based concentration ratio of the carboxylic acid concentration to the metal ion concentration of the carboxylic acid metal salt in the aqueous solution used in the second-stage chemical treatment step (carboxylic acid concentration/metal ion concentration) was 13.5. The measurement results for the EVOH pellets thus produced are shown below in Table 1.

Example 2

EVOH pellets were produced in substantially the same manner as in Reference Example 1, except that the amount of acetic acid contained in the aqueous solution used in the second-stage chemical treatment step was changed from 700 ppm to 2,450 ppm and the weight-based concentration ratio of the carboxylic acid concentration to the metal ion concentration of the carboxylic acid metal salt in the aqueous solution used in the second-stage chemical treatment step (carboxylic acid concentration/metal ion concentration) was 23.6. The measurement results for the EVOH pellets thus produced are shown below in Table 1.

Example 3

EVOH pellets were produced in substantially the same manner as in Reference Example 1, except that the amount of acetic acid contained in the aqueous solution used in the second-stage chemical treatment step was changed from 700 ppm to 2,450 ppm, that the weight-based concentration ratio of the carboxylic acid concentration to the metal ion concentration of the carboxylic acid metal salt in the aqueous solution used in the second-stage chemical treatment step (carboxylic acid concentration/metal ion concentration) was 23.6, and that the temperature of nitrogen gas in the ventilation dryer of batch box type in the drying step was changed from 125° C. to 150° C. The measurement results for the EVOH pellets thus produced are shown below in Table 1.

Example 4

EVOH pellets were produced in substantially the same manner as in Reference Example 1, except that the amount of acetic acid contained in the aqueous solution used in the second-stage chemical treatment step was changed from 700 ppm to 3,500 ppm and the weight-based concentration ratio of the carboxylic acid concentration to the metal ion concentration of the carboxylic acid metal salt in the aqueous solution used in the second-stage chemical treatment step (carboxylic acid concentration/metal ion concentration) was 33.7. The measurement results for the EVOH pellets thus produced are shown below in Table 1.

Example 5

EVOH pellets were produced in substantially the same manner as in Reference Example 1, except that the amount of acetic acid contained in the aqueous solution used in the second-stage chemical treatment step was changed from 700 ppm to 3,500 ppm, that the weight-based concentration ratio of the carboxylic acid concentration to the metal ion concentration of the carboxylic acid metal salt in the aqueous solution used in the second-stage chemical treatment step (carboxylic acid concentration/metal ion concentration) was 33.7, and that the temperature of nitrogen gas in the ventilation dryer of batch box type in the drying step was changed from 125° C. to 150° C. The measurement results for the EVOH pellets thus produced are shown below in Table 1.

Comparative Example 1

EVOH pellets were produced in substantially the same manner as in Reference Example 1, except that the amount of acetic acid contained in the aqueous solution used for the adjustment of the acetic acid content was changed from 700 ppm to 350 ppm, that the weight-based concentration ratio of the carboxylic acid concentration to the metal ion concentration of the carboxylic acid metal salt in the aqueous solution used in the second-stage chemical treatment step (carboxylic acid concentration/metal ion concentration) was 3.4, and that the temperature of nitrogen gas in the ventilation dryer of batch box type in the drying step was changed from 125° C. to 118° C. The measurement results for the EVOH pellets thus produced are shown below in Table 1.

Comparative Example 2

EVOH pellets were produced in substantially the same manner as in Reference Example 1, except that the water content of the EVOH pellets was adjusted to 1.1% by controlling the drying conditions. The measurement results for the EVOH pellets thus produced are shown below in Table 1.

structural portions of the extruder. The stagnating resin is liable to be exposed to conditions that are much severer than the aforementioned evaluation conditions. Therefore, it is considered that the differences between Examples and Comparative Examples in the evaluation are significantly enhanced in the practical applications.

While specific forms of the embodiments of the present disclosure have been shown in the aforementioned examples, the examples are merely illustrative of the disclosure but not limitative of the disclosure. It is contemplated that various modifications apparent to those skilled in the art could be made within the scope of the disclosure.

The EVOH pellets of the present disclosure are excellent in high-temperature thermal decomposition-suppressing effect and thermal stability, and are free from odor emanation and coloration even if being processed at a higher temperature, because the lactone ring content ratio with respect to the sum of the carboxylic acid content and the lactone ring content and the water content are adjusted within the predetermined ranges. Therefore, the EVOH pellets of the present disclosure can be formed into cups, trays, tubes, and other containers, and the stretched film formed from the EVOH pellets can be formed into bags and caps. These packaging materials can be widely used for packaging foods, beverages, pharmaceutical products, cosmetics, industrial chemicals, detergents, agricultural chemicals, fuels, and the like.

TABLE 1

| | Reference Example 1 | Example 1 | Example 2 | Example 3 | Example 4 | Example 5 | Comparative Example 1 | Comparative Example 2 |
|---|---|---|---|---|---|---|---|---|
| Carboxylic acid content (X) (mol %) | 0.09 | 0.08 | 0.08 | 0.08 | 0.08 | 0.09 | 0.11 | 0.09 |
| Lactone ring content (Y) (mol %) | 0.12 | 0.13 | 0.13 | 0.12 | 0.14 | 0.14 | 0.12 | 0.12 |
| Lactone ring content ratio (Y/Z) (mol %) | 57 | 60 | 62 | 61 | 64 | 62 | 52 | 57 |
| Water content (%) | 0.22 | 0.21 | 0.43 | 0.26 | 0.42 | 0.13 | 0.19 | 1.1 |
| Thermal stability (° C.) [5% weight reduction] | 361 | 363 | 363 | 362 | 363 | 363 | 343 | 345 |
| Thermal stability (° C.) [weight reduction of 5% + water content] | 362 | 364 | 364 | 364 | 365 | 363 | 345 | 350 |

The above results indicate that Examples, which satisfy the requirements, of the present disclosure for the lactone ring content ratio (Y/Z) with respect to the sum (Z) of the carboxylic acid content (X) and the lactone ring content (Y) in the EVOH terminal structures and for the water content, are excellent in high-temperature thermal stability. On the other hand, Comparative Example 1, which does not satisfy the requirement for the lactone ring content ratio (Y/Z), and Comparative Example 2, which does not satisfy the requirement for the water content, are both poorer in thermal stability (as evaluated based on the 5% weight reduction). In the evaluation for the thermal stability based on the additional weight reduction corresponding to the original water content, Comparative Examples 1 and 2 are poorer in thermal stability.

In the evaluation for the thermal stability, a temperature difference of 1° C. or greater at higher temperatures is significant from the viewpoint of reaction kinetics in practical applications, because the oxidative degradation and the thermal decomposition of the resin occur due to chemical reactions and, in general, the reaction rates of the chemical reactions are exponentially increased with temperature increase. More specifically, where a resin composition is used in an industrial extruder, the resin inevitably stagnates in an adapter, a feeding block, a die, and other mechanical

The invention claimed is:

1. Ethylene-vinyl alcohol copolymer pellets comprising:
an ethylene-vinyl alcohol copolymer; and
water;
wherein the ethylene-vinyl alcohol copolymer comprises monomer units including at least an ethylene unit and a vinyl alcohol unit, and a carboxylic acid group and a lactone ring present in terminal structures of the ethylene-vinyl alcohol copolymer;
wherein a ratio (Y/Z) of a lactone ring content (Y) to a sum (Z) of a carboxylic acid content (X) and the lactone ring content (Y) is not less than 60% in molar ratio; and
wherein the pellets have a water content of not higher than 0.5 wt. %.

2. The ethylene-vinyl alcohol copolymer pellets according to claim 1, wherein the sum (Z) of the carboxylic acid content (X) and the lactone ring content (Y) is 0.01 to 0.3 mol % based on a total amount of the monomer units of the ethylene-vinyl alcohol copolymer.

3. The ethylene-vinyl alcohol copolymer pellets according to claim 1, wherein the lactone ring content (Y) is 0.01 to 0.3 mol % based on the total amount of the monomer units of the ethylene-vinyl alcohol copolymer.

4. The ethylene-vinyl alcohol copolymer pellets according to claim 1, wherein the carboxylic acid content (X) is 0.01 to 0.3 mol % based on the total amount of the monomer units of the ethylene-vinyl alcohol copolymer.

5. A resin composition comprising a resin of the ethylene-vinyl alcohol copolymer pellets according to claim 1.

6. A multilayer structure comprising a plurality of layers at least one of which comprises a resin of the ethylene-vinyl alcohol copolymer pellets according to claim 1.

* * * * *